(12) United States Patent
Schroffenegger et al.

(10) Patent No.: US 11,906,284 B2
(45) Date of Patent: Feb. 20, 2024

(54) METHOD AND DEVICE FOR DETECTING THE EDGE OF AN OBJECT

(71) Applicant: Balluff GmbH, Neuhausen a.d.F. (DE)

(72) Inventors: Juri Schroffenegger, Munich (DE); Sergej Hense, Munich (DE)

(73) Assignee: BALLUFF GMBH, Neuhausen ADF (DE)

( * ) Notice: Subject to any disclaimer, the term of this patent is extended or adjusted under 35 U.S.C. 154(b) by 0 days.

(21) Appl. No.: 17/181,223

(22) Filed: Feb. 22, 2021

(65) Prior Publication Data

US 2021/0262782 A1    Aug. 26, 2021

(30) Foreign Application Priority Data

Feb. 25, 2020  (DE) .......................... 102020104931.5

(51) Int. Cl.
  *G01B 11/14* (2006.01)
  *G01B 11/02* (2006.01)
  (Continued)

(52) U.S. Cl.
  CPC ............ *G01B 11/14* (2013.01); *G01B 11/024* (2013.01); *G01B 11/028* (2013.01); *G01S 17/04* (2020.01); *G01V 8/20* (2013.01); *B65H 2553/416* (2013.01)

(58) Field of Classification Search
  CPC . H01L 21/67259; H01L 21/681; G01D 5/342; B65H 7/14; B65H 2553/416; G01S 17/04; G01V 8/10; G01V 8/20; G01V 8/26; G01B 11/02; G01B 11/024; G01B 11/026; G01B 11/028; G01B 11/04; G01B 11/043; G01B 11/046; G01B 11/14
  (Continued)

(56) References Cited

U.S. PATENT DOCUMENTS 4,559,452 A * 12/1985 Igaki ...................... G07D 7/162
                                                                356/637
4,694,153 A    9/1987 Bejczy et al.
(Continued)

FOREIGN PATENT DOCUMENTS

DE           10149196       11/2002
DE         102005032526     11/2006
(Continued)

*Primary Examiner* — Gordon J Stock, Jr.
(74) *Attorney, Agent, or Firm* — GableGotwals

(57) ABSTRACT

A method for detecting an edge of an object is carried out by means of a detection device (10), which has an emission region running along a first straight line and has a receiving region which runs along a second straight line, which is arranged in parallel to the first straight line. An emission subregion (11*a-p*) of the emission region is selected, which extends up to a first end of the emission region. Light is emitted from the emission subregion (11*a-p*) and a light signal of light reflected on the object is received in the receiving region. The emission subregion (11*a-p*) is then shifted along the first straight line in the direction of a second end of the emission region. Emitting, receiving and shifting are repeated until the emission subregion (11*a-p*) extends up to the second end at the start of the shifting step. A signal course is compiled from the received light signals, and the detection of the edge from the signal course is carried out.

8 Claims, 8 Drawing Sheets

(51) Int. Cl.
*G01V 8/20* (2006.01)
*G01S 17/04* (2020.01)

(58) Field of Classification Search
USPC .................................................. 250/559.36
See application file for complete search history.

(56) References Cited

U.S. PATENT DOCUMENTS

| | | | | |
|---|---|---|---|---|
| 5,021,674 | A * | 6/1991 | Brunner | B65H 23/0216 |
| | | | | 250/548 |
| 5,220,177 | A * | 6/1993 | Harris | G01V 8/20 |
| | | | | 250/548 |
| 6,348,696 | B1 * | 2/2002 | Alt | G01B 11/028 |
| | | | | 250/559.12 |
| 7,202,492 | B2 * | 4/2007 | Inhelder | G01N 21/8901 |
| | | | | 356/429 |
| 8,888,093 | B2 * | 11/2014 | Ino | B65H 9/006 |
| | | | | 271/227 |
| 2004/0211904 | A1 * | 10/2004 | Scowen | B65H 7/14 |
| | | | | 250/341.1 |
| 2014/0097334 | A1 * | 4/2014 | Hotta | G01V 8/20 |
| | | | | 250/221 |
| 2014/0333939 | A1 * | 11/2014 | Merettig | G01D 5/26 |
| | | | | 356/614 |

FOREIGN PATENT DOCUMENTS

| | | | | |
|---|---|---|---|---|
| DE | 102017010880 A1 * | 5/2019 | ......... | B65H 23/0204 |
| JP | 2001518208 A * | 10/2001 | | |

* cited by examiner

METHOD AND DEVICE FOR DETECTING THE EDGE OF AN OBJECT

CROSS-REFERENCE TO RELATED APPLICATIONS

This United States application claims priority to German Patent Application No. 102020104931.5 filed 25 Feb. 2020, which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC OR AS A TEXT FILE VIA THE OFFICE ELECTRONIC FILING SYSTEM

Not Applicable

STATEMENT REGARDING PRIOR DISCLOSURES BY THE INVENTORS OR A JOINT INVENTOR

Not Applicable

BACKGROUND OF THE INVENTION

Field of the Invention

The present invention relates to a method for detecting the edge of an object by means of a detection device. Furthermore, it relates to a detection device which is set up to carry out an edge detection of an object by means of the method.

Description of Related Art

When transporting them in a transport system, silicon wafers are only held on their contact points by friction, when transporting them in a transport system. Therefore, this can result in displacements of the silicon wafer during transportation. However, in order to process the silicon wafer within a processing plant through which it is transported by means of the transport system, exact knowledge of its position is required, such that displacements of the silicon wafer in relation to its starting position would have to be detected.

In a transport system, the silicon wafer is transported on a so-called blade. This typically has a thickness of circa 4 mm. When a sensor for position determination is to be integrated in the blade, it may not exceed this measurement. Thus, a position detection cannot be achieved in a transmitted light method. Indeed, in a transmitted light method, high levels of accuracy can be achieved, however this involves two opposite sensor elements, namely a transmitter and a receiver, having to be mounted in the application. This automatically causes is too large a constructive shape.

In order to achieve high resolutions with a static transmitter, an optical processing of the light of a corresponding light source would be necessary. Thus, for example in laser light bands, a light band is generated from parallel light beams. Yet such a processing always causes a minimum propagation stretch of the light in front of or in the optical element of a few centimetres, in order to be able to parallelise this, which correspondingly has an impact on the constructive size of the transmitter. A further possibility of the position determination is the use of a diffuse sensor. The usual form of its implementation is the energetic sensor. This is based on the method of the light amount measurement. However, this concept is mostly not implemented in a spatial resolution manner. Moreover, this has the disadvantage that a distinction cannot be made between a change in the position of the silicon wafer, in the reflectivity or the spacing.

BRIEF SUMMARY OF THE INVENTION

An object of the invention is to provide a method with which displacements of a silicon wafer in a transport system can be detected. Here, the method should be used by a device, which can be integrated into a blade. A further object of the invention is to provide such a device.

In one aspect, this object is solved by a method for detecting the edge of an object. The edge detection is suitable for detecting a displacement of the object in relation to a target position, since this is accompanied by a displacement of the detected edge. The method makes use of a detection device which has an emission region running along a first straight line. Furthermore, it has a receiving region which runs along a second straight line. The two straight lines are arranged in parallel to each other.

In the method, the emission region is divided into emission subregions. The emission subregions are respectively shorter than the emission region and, in particular, are all the same length. Firstly, an emission subregion is selected which extends up to a first end of the emission region. Then, light is emitted from this emission subregion. A light signal of light reflected on the object is received in the receiving region. Then, the emission subregion is shifted along the first straight line in the direction of a second end of the emission subregion. The emission, reception and shifting is repeated until the emission subregion extends up to the second end at the start of the emission step. Now, the light signals received are compiled to form a signal course. A detection of the edge can then be carried out from the signal course.

The knowledge underlying this method is that, when using such a detection device, emitting light from the entire emission region in the receiving region would generate a signal which would not have a level of accuracy acceptable for use in a silicon wafer. The reason for this is the Lambertian irradiation characteristic of the emission region. Light beams which are emitted perpendicularly to the receiving region deliver a signal which projects the position of the object. Beam paths which deviate from this lead to a smear of the signal. Thus, light which is emitted at a shallow angle can be reflected by the object and registered by the detector at a point where there is no object. In the signal course, this would be expressed by a slowly declining edge at the position of the edge, whereby an exact position determination of the edge would not be possible. In order to obtain a high spatial resolution, the use of parallelised or collimated light would be possible in principle. Thus, deviating beam paths would be avoided. However, the optical elements necessary for this, such as lenses or prisms, would involve such a massive increase of the dimensions of the detection device that this would no longer be suitable for the intended installation in a blade. In order to nevertheless obtain a certain amount of parallelisation of the light and thus to clearly increase the exactness of the measuring, the emission region is, according to the invention, divided into emission subregions. The emission subregions are activated and evaluated sequentially until all emission subregions have been taken into consideration for the overall measuring. It is then only checked in the compiled signal course at which point of the signal course a signal course characteristic for the presence of an edge occurs.

In order to be able to divide the emission region into several emission subregions and to be able to control these separately, it is preferred that several light sources are arranged in the emission region. In particular, the light sources can be LEDs.

In an embodiment of the method, each emission subregion contains a light source. When shifting the emission subregion, it is respectively shifted by one light source, such that each light source emits light once, one after the other along the first straight line.

In another embodiment of the method, it is provided that each emission subregion respectively contains several light sources. Preferably, each emission subregion contains two light sources. In the shifting step, the emission subregion is here respectively shifted around a light source. This means that each emission subregion overlaps with the preceding emission subregion. When each emission subregion contains two light sources, then the light source arranged on the first end of the emission region and the light source arranged on the second end of the emission region respectively emit light once, and every other light source respectively emits light twice.

In order to further increase the exactness of the method, it is preferred that not only the emission region is divided into subregions. Instead, a division of the receiving region into subregions is also carried out. The reception of the light is then carried out in each reception step only in a receiving subregion.

Here, preferably not only the emission subregion is shifted in each shifting step, but rather the receiving subregion is also shifted along the second straight line from a first end in the direction of a second end of the second straight line.

The receiving subregion preferably has a length along the second straight line which corresponds to the length of the emission subregion along the first straight line. This can be achieved particularly preferably by the emission region and the receiving region being divided into sectors orthogonally in relation to the two straight lines. Each sector then contains an emission subregion and a receiving subregion. Then, the receiving subregion is preferably used for receiving, which is in the same sector as the emission subregion which has emitted light immediately before this.

In order to prevent light falling out of the emission region into the receiving region without having been reflected before this by the object, it is preferred that the emission region and the receiving region are separated by an opaque separating element. This is arranged in parallel to the two straight lines and is orthogonal to the plane in which the two straight lines run.

The detection of the edge is preferably carried out from a flank in the signal course. This can be achieved, in particular, by checking in the signal course at which point the signal exceeds a threshold value. The position of the edge of the object can then be allocated to this point.

When using this method, the resolution of the detection device is not constant across the entire length of the receiving region. The origin of this behaviour is that, if the edge of the object lies between two light sources, i.e. in the vicinity of the boundary between two receiving subregions, this is already projected in the next receiving subregion. When this next receiving subregion is not active, then the signal is only partially taken into consideration. This effect is smaller with an increasing number of emission subregions and with increasing length of the receiving subregions. However, a greater number of light sources is required for increasing the number of the emission subregions. A larger overlap of the receiving subregions, i.e. also a greater number of active light sources per emission process, in each emission subregion is required for an increase of the number of the receiving subregions when the number of light sources is unchanged. In order to be able to dispense with these measures, it is preferred that the nonlinearity of the coherence between a position of the flank and a position of the edge is compensated for. Since the deviation is a systematic error, the compensation can be carried out by choosing a suitable back-calculation method when a reference measuring has been carried out in advance by means of the detection device.

In a further aspect of the invention, the object is solved by a detection device which is set up in order to carry out a detection of an edge of an object by means of the method.

Along with the possibility of integrating the detection device in a blade and thus carrying out an edge detection of a silicon wafer, the method offers various further usage possibilities. For example, if two detection devices are combined in a rectangular arrangement, then this makes it possible to determine the position of an object in a plane. If three detection devices are combined, then the diameter of a round object can additionally also be determined. For this, it is preferred that the detection devices are arranged on a plane in such a way that they respectively form an angle of 120° in relation to one another.

Since the method can be used where an exact location query of an object is necessary yet the available space for the detection device is limited, the method can also be used, in particular, in web edge control.

By means of the method, not only the edge of reflecting objects can be detected but also the diffusely reflecting objects. Only greatly absorbing objects, as common for the light sensor principle, cannot be detected. However, this problem can be circumvented by a reflector being positioned behind the object.

BRIEF DESCRIPTION OF THE SEVERAL VIEWS OF THE DRAWINGS

Exemplary embodiments of the invention are depicted in the drawings and are explained in more detail in the description below.

FIG. 1b shows an isometric depiction of the detection device according to FIG. 1a.

DETAILED DESCRIPTION OF THE INVENTION

Figure 1A:
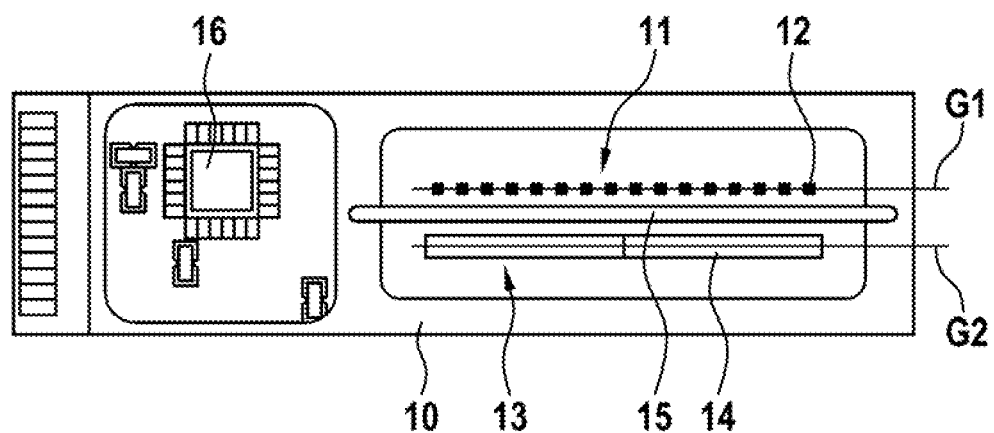
FIG. 1a shows a top view of a detection device according to an exemplary embodiment of the invention.
Figure 1B:
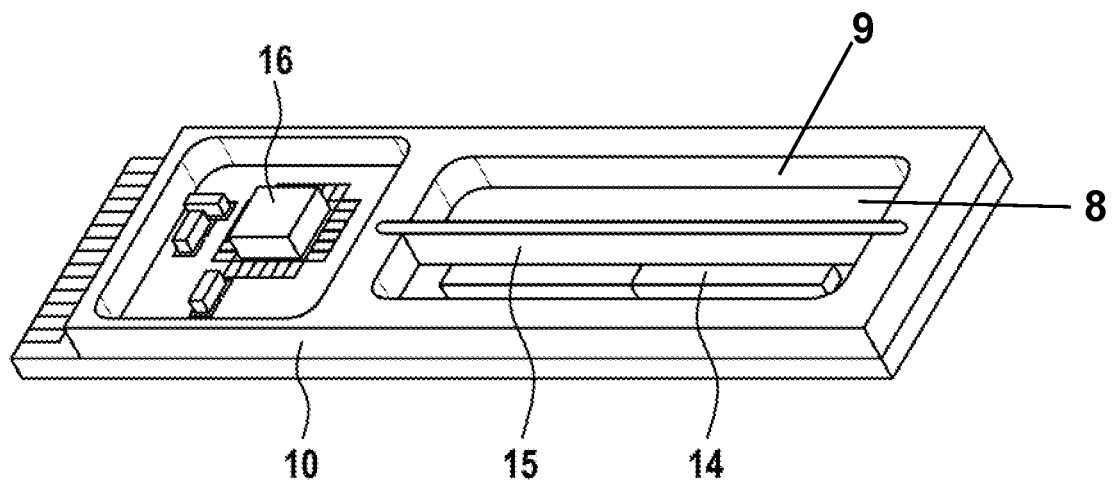

A detection device 10 according to an exemplary embodiment of the invention, which can be used in exemplary embodiments of the method according to the invention, is depicted in FIGS. 1a and 1b. This comprises a circuit board on which an emission region 11 is formed by sixteen LEDs 12 which are arranged along a first straight line G1 at equal distances apart. Each of the LEDs 12 is contacted individually and can be controlled separately. A receiving region 13 runs in parallel to the emission region 11 along a second straight line G2. This is formed by two photodiode array chips 14. Here, each photodiode array chip 14 has one hundred and twenty eight individually readable photodiode regions, which enable a spatial resolution of a received light intensity along the second straight line G2. In order to avoid an optical crosstalk between the emission region 11 and the receiving region 13, the two are optically separated from each other by an opaque separating element 15. In the present exemplary embodiment, this is a non-transparent matt black film. In order to ensure the separation and in order to facilitate the mounting of the separating element 15, a gap is cut in the middle in the circuit board in which the separating element 15 is inserted and fixed.

A plastic frame 9 is arranged on the circuit board, in which frame a region around the transmission region 11, the receiving region 13 and the separating element 15 is hollow. This recessed hollow region 8 is filled with a transparent optical casting material. In a further recess, a multiplex chip 16 is arranged which controls the LEDs 12 and receives data of the photodiode array chips 14. This region is cast with a transparent material. The two casting materials serve to protect the components received and cast therein. In order to avoid an irregular deflection of the light paths in transparent casting material, this is sanded flatly and polished after it has hardened.

Figure 2:
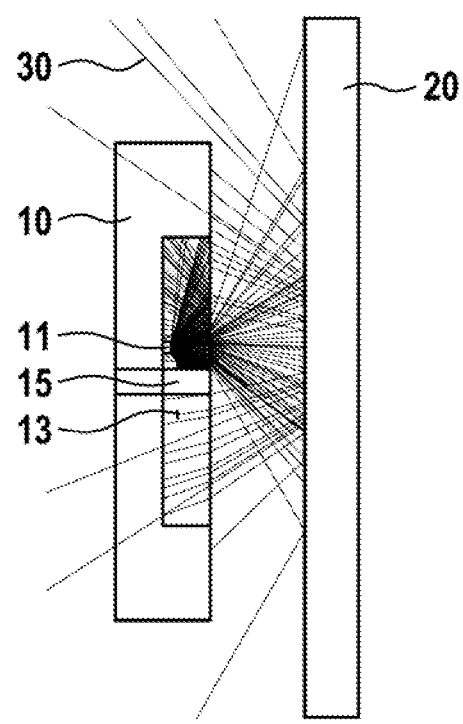
FIG. 2 shows the reflection of light on an object which is emitted by a light source of a detection device according to an exemplary embodiment of the invention.
Figure 3:
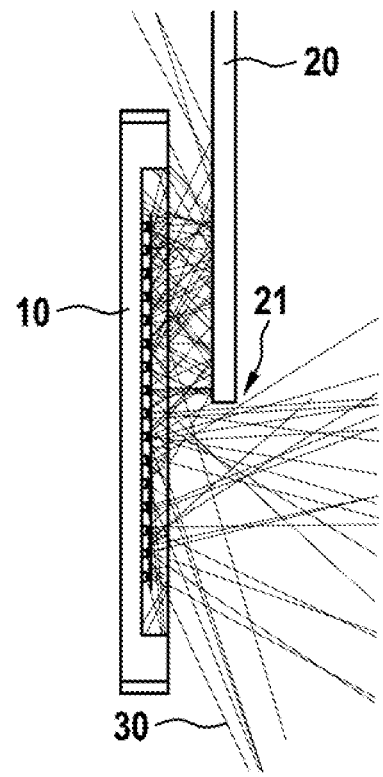
FIG. 3 shows the reflection of light on an edge of an object when all light sources of a detection device according to an exemplary embodiment of the invention are activated.

It is depicted in FIG. 2 that an object 20 facing the detection device 10 as a reflector reflects emitted light 30 and thus guides it out of the emission region 11 into the receiving region 13. FIG. 3 shows how an edge 21 of the object 20 can be detected due to the beam path of the light 30. Here, the one-dimensional embodiment of the emission region 11 and the receiving region 13 is used.

Figure 4A:
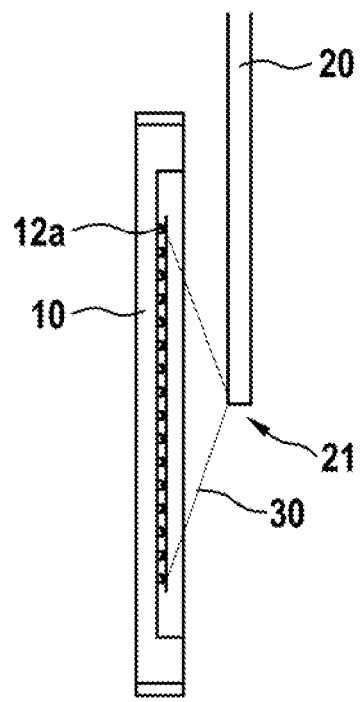
FIG. 4a shows the reflection of a light beam on an edge of an object which is emitted from a light source of a detection device according to an exemplary embodiment of the invention.
Figure 4B:
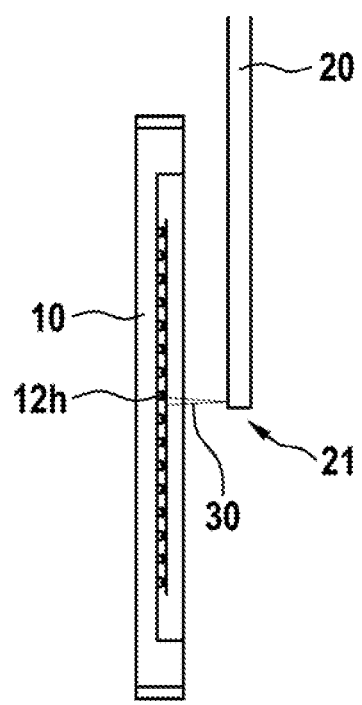
FIG. 4b shows the reflection of a light beam on an edge of an object which is emitted from a different light source of a detection device according to an exemplary embodiment of the invention.

The sixteen LEDs 12 of the emission region 11 are referred to below as LEDs 12a-p along the first straight line G1. Here, the first LED 12a is on a first end of the emission region 11 and the sixteenth LED 12p is on a second end of the emission region 11. In FIGS. 4a and 4b, it is depicted how the beam path of light, reflected on an edge 21, of the first LED 12a runs as a flatly emitted light beam and of the eighth LED 12h as an approximately perpendicularly emitted light beam. While the approximately perpendicularly emitted light beam is reflected adjacently to the eighth LED 12h into the received region 13, the flatly emitted light beam emitted from the first end of the emission region 11 is carried out on a point of the receiving region 13 near the second end of the emission region 11.

Figure 5:
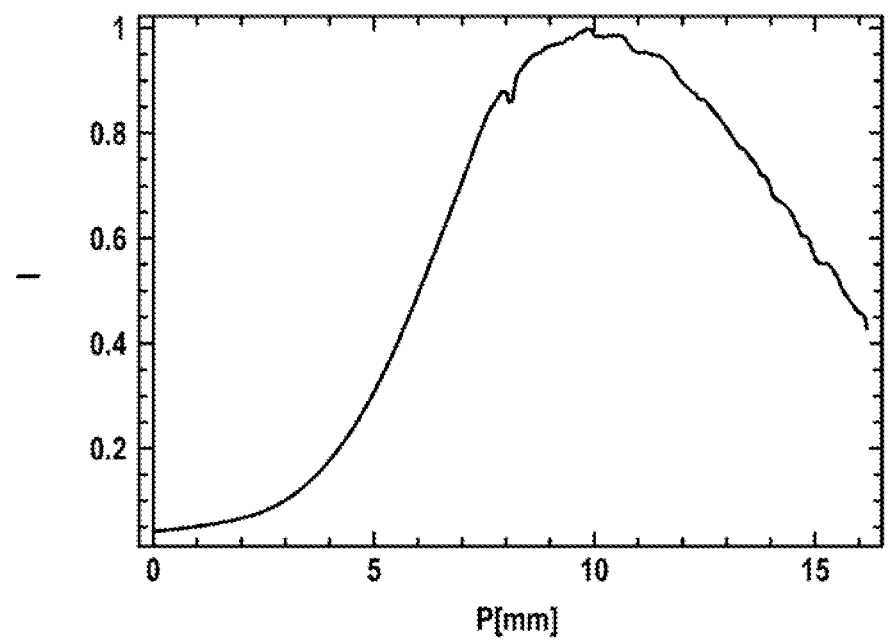
FIG. 5 shows a signal course of a detection device when activating its entire emission region.

If the detection device were to be operated in such a way that all LED 12a-p were activated simultaneously and a receipt were carried out by means of the entire receiving region 13, then a signal course I standardised to a value of one would emerge depending on the position P along the two straight lines G1, G2, as is depicted in FIG. 5. The edge 21 is expressed by a slowly inclining flank of the signal course I and can therefore not be detected exactly.

Figure 6:
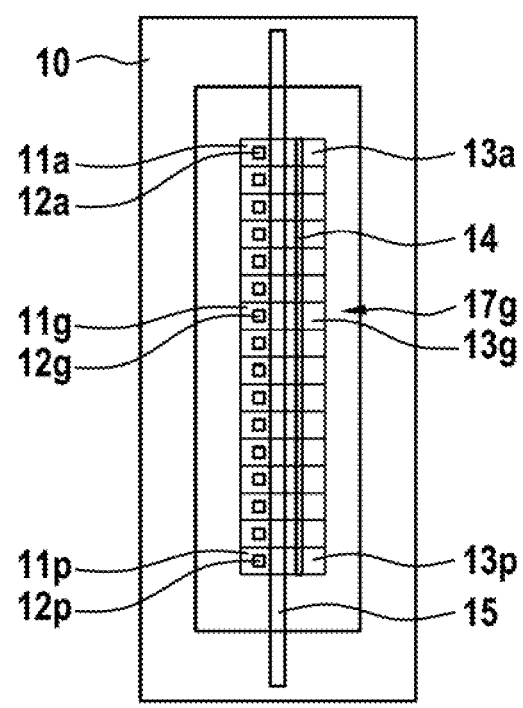
FIG. 6 shows a schematic depiction of emission subregions and reception sub-regions which are used in a method according to an exemplary embodiment of the invention.

In a first exemplary embodiment of the method according to the invention, the emission region 11 is divided into sixteen emission subregions 11a to 11p which each contain one of the LEDs 12a-p. This is depicted in FIG. 6. Adjacently to each emission subregion 11a-p, a receiving subregion 13a-p of the receiving region 13 is defined. Thus, each of the emission subregions 11a-p together with its adjacent receiving subregion 13a-p form a sector 17a-p. This is depicted for the sector 17g which consists of the emission subregion 11g and the receiving subregion 13g.

Figure 7:
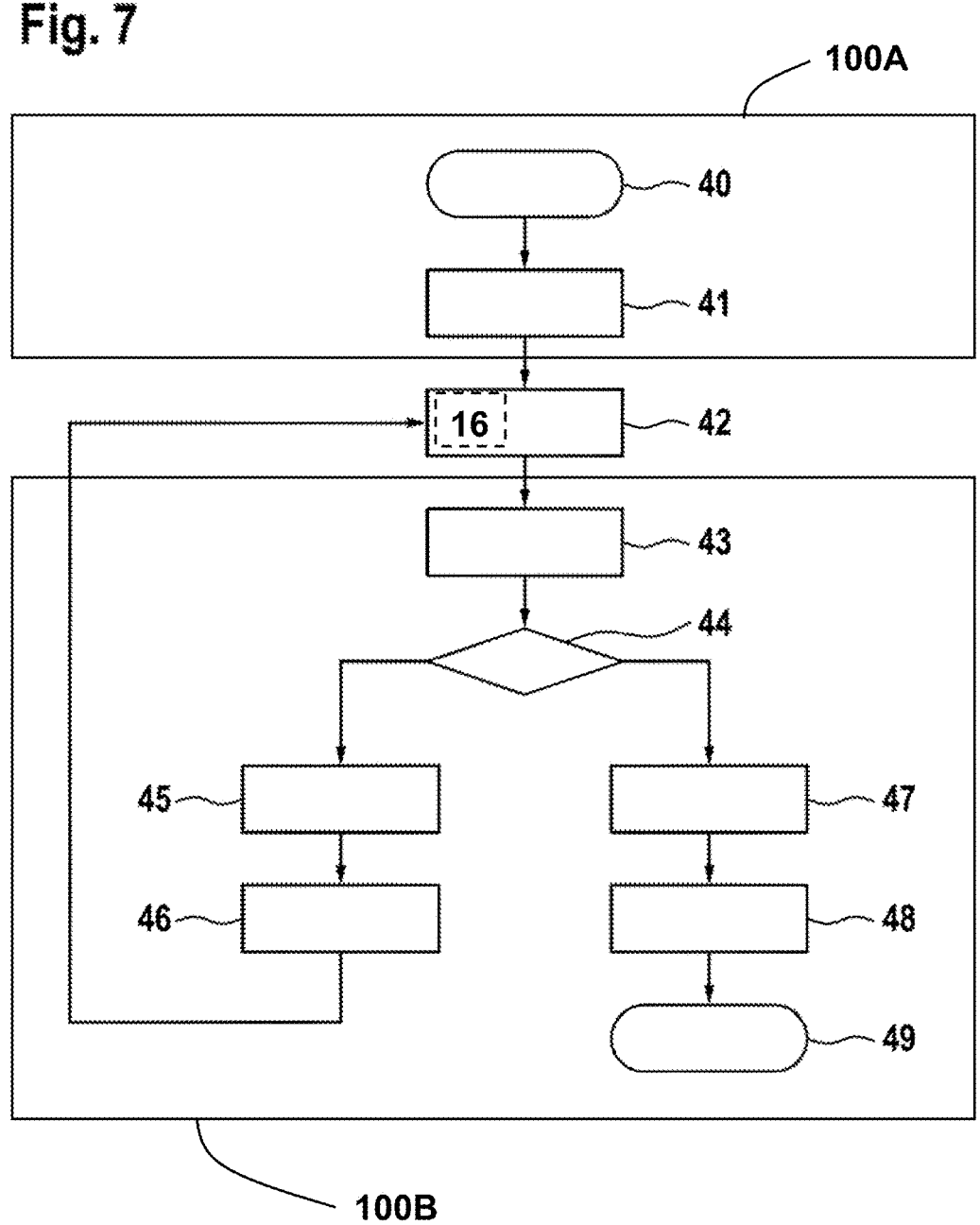
FIG. 7 shows a flow chart of an exemplary embodiment of the method according to the invention.
Figure 8:
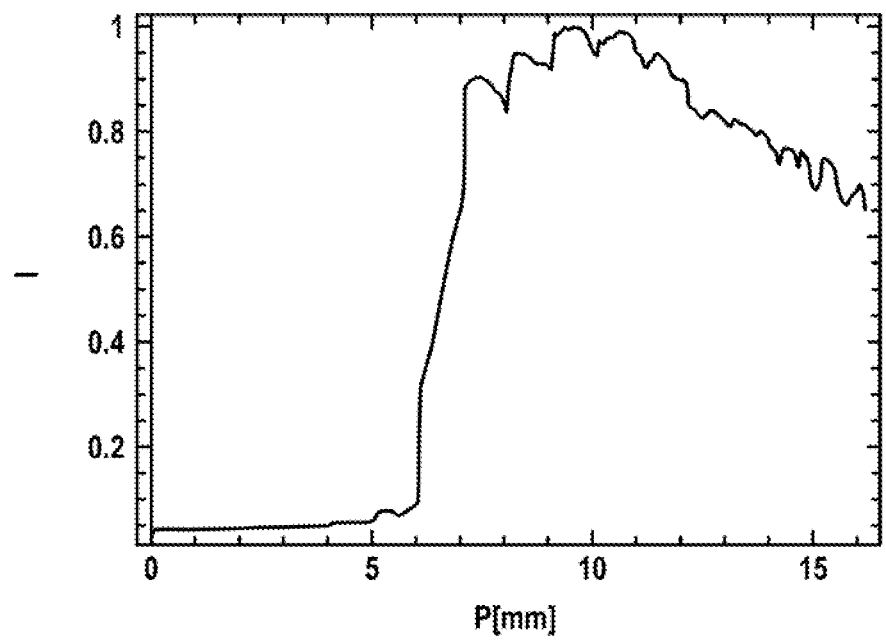
FIG. 8 shows a signal course which is obtained in an exemplary embodiment of the method according to the invention.

As depicted in FIG. 7, after the start 40 of the method, firstly a selection 41 of a first transmission subregion of the transmission region is carried out by a micro controller 100A, 100B. Here, the emission subregion 11a is selected, which extends up to the first end of the emission region 11. Furthermore, a first receiving subregion 13a of the receiving region 13 is selected which extends up to the first end of the receiving region 13. The first emission subregion 11a and the first receiving subregion 13a have the same length along their respective straight line G1, G2 and form a common sector. By controlling the first LED 12a by means of the multiplex chip 16, emitting 42 of light 30 is carried out from the first emission subregion 11a. Light 30 reflected on the object 20 is received in the first receiving subregion 13a as light signal I. The light signal I is stored. Now, checking 44 occurs as to whether the last used emission subregion and the last used receiving subregion already extend up to the second end of the first straight line G1 or up to the second end of the second straight line G2, respectively. If this is not the case, shifting 45 the emission subregion along the first straight line G1 is carried out, such that, when first running through the method, a shifting from the first emission subregion 11a into the second emission subregion 11b is carried out. Furthermore, a shifting 46 of the receiving subregion along the second straight line G2 is carried out such that a shifting from the first receiving subregion 13a into the second receiving subregion 13b is carried out. Thus, an emission subregion and a receiving subregion, which are in the same sector, are again simultaneously active. Then the method is continued with a new emission 42 and receipt 43. This is repeated until the checking 44 results in reaching the end of the two straight lines G1, G2. Then compiling 47 stored light signals is carried out to form a signal course, as is depicted in FIG. 8. After a detection 48 of the edge 41 is carried out from the signal course, the method ends 49.

Figure 9:
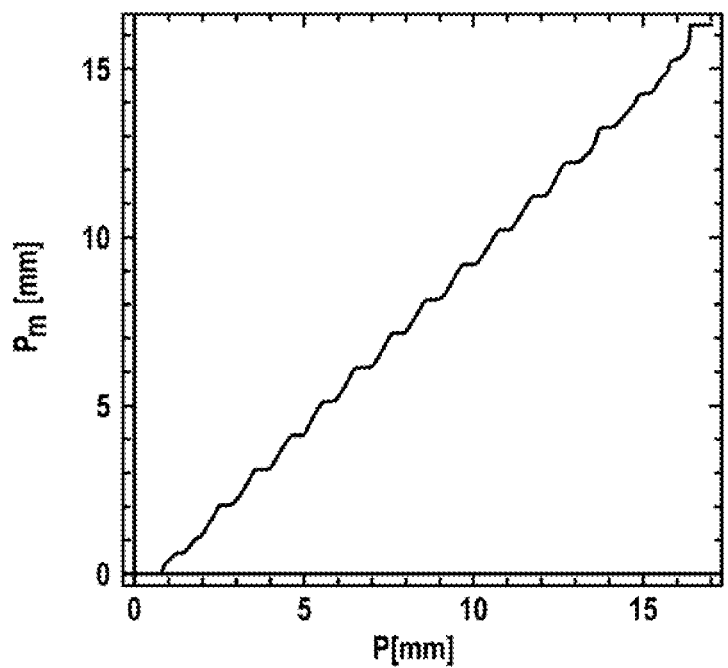
FIG. 9 shows, in a diagram, a nonlinearity of the coherence between a measured and an actual position of an edge of an object in a method according to an exemplary embodiment of the invention.

The signal course according to FIG. 8 differs from the signal course according to FIG. 5 by a substantially steeper flank, which enables a more accurate determination of the position P of the edge 21. During this detection 48, it is taken into consideration that the connection between the actual position P of the edge 21 and the position $P_m$ determined form the measurements is not linear, as is depicted in FIG. 9. This nonlinearity which is depicted in FIG. 9 for a detection device 10 with sixteen LEDs 12a-p controlled in the manner described above has been determined in advance by a reference measuring.

Figure 10A:
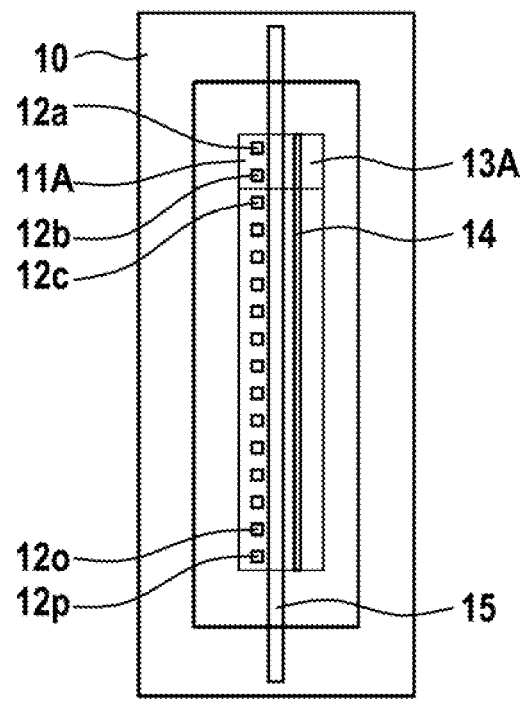
FIG. 10a shows an emission subregion and a receiving subregion in a method according to an exemplary embodiment of the invention.
Figure 10B:
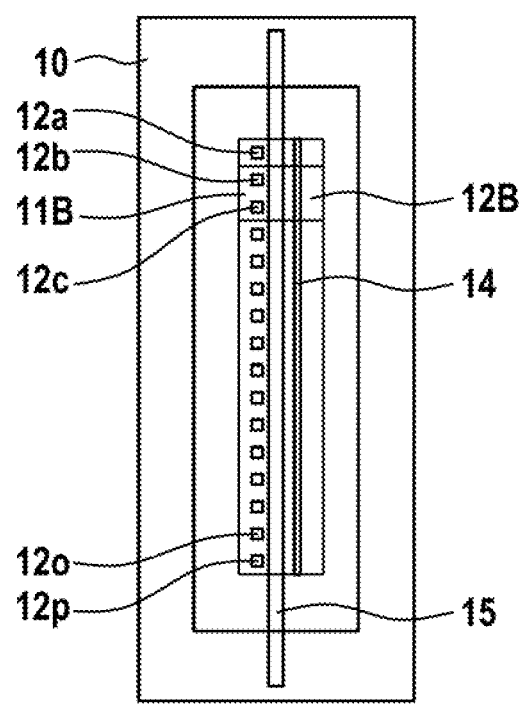
FIG. 10b shows a different emission subregion and a different receiving subregion in an exemplary embodiment of the method according to the invention.
Figure 10C:
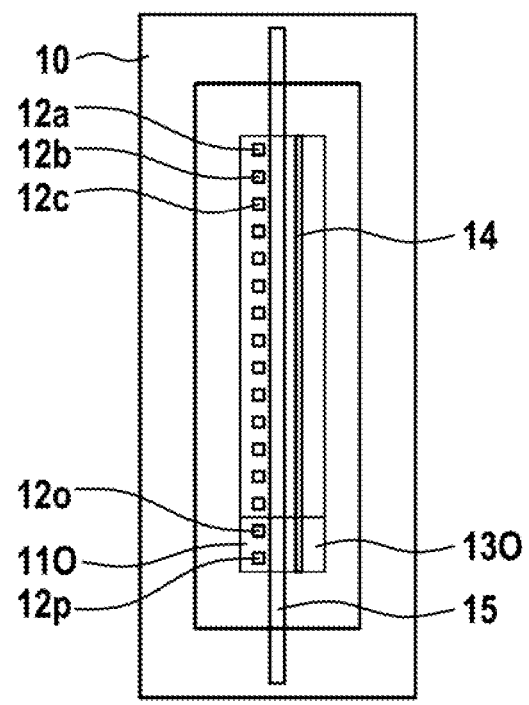
FIG. 10c shows yet another emission subregion and yet another receiving subregion in an exemplary embodiment of the method according to the invention.

In another exemplary embodiment of the method according to the invention, when using the same detection device 10, only 15 sectors are defined. Now, each emission subregion 11A-0 contains two LEDs, which, with the same length of the emission subregion 11A-0 and the receiving subregions 13A-0, leads to longer receiving subregions 13A-0. In the same way as in the exemplary embodiment of the method described above, each emission subregion 11A-0 is constantly shifted by one LED 12a-p, such that each emission subregion 11A-0 constantly contains an LED of the previous emission subregion 11A-O. This is depicted in FIGS. 10a to 10c for the first emission subregion 11A, the second emission subregion 11B and the final emission subregion 11O. The receiving emission regions 13A-0 are shifted analogously to the emission subregions 11A-0, such that here too each new receiving subregion 13A-0 overlaps with the previous receiving subregion 13A-0.

The invention claimed is:

1. Method for detecting (48) an edge (21) of an object (20) by means of a detection device (10) comprising a micro controller for compiling a signal course and storing signals to determine a threshold value edge point of the object, an emission region (11) running along a first straight line (G1) and a receiving region (13) running along a second straight line (G2) in a plane arranged parallel to the first straight line (G1) in a plane, wherein, the emission region (11) includes a plurality of emission subregions (11a-p, 11A-O) each emission subregion including at least one light source;
   wherein, the receiving region (13) includes a plurality of receiving subregions (13a-p, 13A-0);
   the method comprising:
   a) selecting (41) an emission subregion (11a-p, 11A-O) of the emission region (11), wherein the selected emission subregion (11a-p, 11A-O) has a length along the first straight line (G1) and extends up to a first end of the emission region (11);
   b) forming a common sector by selecting a receiving subregion (13a-p, 13A-O) adjacent and parallel to the selected emission subregion (11a-p, 11A-O), wherein the selected receiving subregion (13a-p, 13A-O) has a length along the second straight line (G2) equal to the length of the emission subregion (11a-p, 11A-0) along the first straight line (G1),
   c) emitting (42) light (30) from the selected emission subregion (11a-p, 11A-O),
   d) receiving (43) a light signal (I) of light (30) reflected on the object (20) only in the selected receiving subregion (13a-p, 13A-O) and storing the light signal,
   e) shifting (45) the selected emission subregion (11a-p, 11A-O) along the first straight line (G1) in the direction of a second end of the emission region (11) and shifting (46) the selected receiving subregion (13a-p, 13A-O) along the second straight line (G2) from a first end in the direction of a second end of the second straight line (G2), wherein when the shifted selected emission subregion is activated, the shifted selected receiving subregion in the common sector is simultaneously activated,
   f) repeating steps c to e until the emission subregion (11a-p, 11A-O) extends up to the second end at the start of step e,
   g) compiling (47) a signal course from the light signals (I) received in step d, and
   h) carrying out the detection (48) of the edge (21) from the signal course.

2. Method according to claim 1, characterized in that the emission subregion (11a-p) contains a light source (12a-p) and is respectively shifted around a light source (12a-p) in step e.

3. Method according to claim 1, characterised in that the emission subregion (11A-O) contains several light sources (12a-p) and is respectively shifted around a light source (12a-p) in step e.

4. Method according to claim 1, characterised in that the receiving region (13) and the emission region (11) are separated by an opaque separating element (15), which is arranged in parallel to the two straight lines (G1, G2) and is orthogonal to the plane in which the two straight lines (G1, G2) run.

5. Method according to claim 1, characterised in that the detection (48) of the edge (21) is carried out in step h from a flank in the signal course.

6. Method according to claim 5, characterised in that, during the detection (48), a nonlinearity of a connection between a position of the flank and a position of the edge (21) is compensated for.

7. A detection device having a micro controller for compiling signal course and storing signals to determine a threshold value edge point for detection (48) of an edge of an object, the detecting device comprises:
   a circuit board comprising:
   an emission region having a plurality of light sources arranged along a first straight line in a plane at equal distances apart and having a length extending up to a first end of the emission region,
   a receiving region having a plurality of individual readable photodiode regions, the receiving region running adjacent and parallel to the emission region along a second straight line in the plane,
   a common sector formed by at least one emission subregion being selected from the emission region and extending up to the end of the emission region and an adjacent parallel at least one receiving subregion being selected from the receiving region, when the at least one emission subregion is activated in the common sector, the receiving subregion in the common sector is simultaneously activated,
   the at least one emission subregion having at least one light source, the receiving subregion receives a reflected light from the object as a light signal,
   an opaque separator located in a recess on the circuit board, a multiplex chip located on the circuit board being adapted to control the light sources in the emission subregion and to transmit light from the emission subregions.

8. Method for detecting an edge of a silicon wafer by means of a detection device having no lens and sized for inclusion in a blade of a transport system, the detection device comprising a micro controller for compiling a signal course and storing signals to determine a threshold value edge point of the silicon wafer, a frame having a recess defining a plane, an emission region running along a first straight line in the plane and a receiving region running along a second straight line in the plane and arranged parallel to the first straight line, the frame further having a divider arranged orthogonal to the plane and separating the emission region and the receiving region and:
- wherein, the emission region includes a plurality of emission subregions each emission subregion including at least one light source;
- wherein, the receiving region includes a plurality of receiving subregions;

the method comprising:
a) selecting an emission subregion of the emission region, wherein the selected emission subregion has a length along the first straight line in the plane and extends up to a first end of the emission region in the plane;
b) forming a common sector selecting a receiving subregion adjacent and parallel to the selected emission subregion, wherein the selected receiving subregion has a length along the second straight line equal to the length of the emission subregion along the first straight line,
c) emitting light from the selected emission subregion,
d) receiving a light signal of light reflected on the object only in the selected receiving subregion and storing the light signal,
e) shifting the selected emission subregion along the first straight line in the direction of a second end of the emission region and shifting the selected receiving subregion along the second straight line from a first end in the direction of a second end of the second straight line, simultaneously activating the emission subregion and the receiving subregion in the common sector,
f) repeating steps c to e until the emission subregion extends up to the second end at the start of step e,
g) after step f, compiling a signal course from the light signals received in step d, and
h) carrying out the detection of the edge of the silicon wafer from the signal course.

\* \* \* \* \*